United States Patent [19]
Kremer et al.

[11] Patent Number: 5,819,251
[45] Date of Patent: Oct. 6, 1998

[54] SYSTEM AND APPARATUS FOR STORAGE RETRIEVAL AND ANALYSIS OF RELATIONAL AND NON-RELATIONAL DATA

[75] Inventors: Mark Kremer, Sunnyvale; Quoc Tai Tran, Redwood Shores; Michael Depledge, San Jose; Santanu Mukhopadhyay, Foster City; William M. Keese, Menlo Park; Behrouz Arbab-Dehkordi, Foster City, all of Calif.

[73] Assignee: Oracle Corporation, Redwood Shores, Calif.

[21] Appl. No.: 595,905

[22] Filed: Feb. 6, 1996

[51] Int. Cl.⁶ .................................................. G06F 17/30
[52] U.S. Cl. ............................... 707/1; 707/104; 707/103
[58] Field of Search .......................... 395/611; 707/100, 707/1, 103, 104

[56] References Cited

U.S. PATENT DOCUMENTS

| | | | |
|---|---|---|---|
| 4,774,661 | 9/1988 | Kumpati | 364/300 |
| 5,157,783 | 10/1992 | Anderson et al. | 395/600 |
| 5,182,708 | 1/1993 | Ejiri | 364/419 |
| 5,261,102 | 11/1993 | Hoffman | 395/700 |
| 5,295,256 | 3/1994 | Bapat | 395/500 |
| 5,379,419 | 1/1995 | Heffernan et al. | 395/600 |
| 5,412,804 | 5/1995 | Krishna | 395/600 |
| 5,412,808 | 5/1995 | Bauer | 395/600 |
| 5,426,780 | 6/1995 | Gerull et al. | 395/600 |
| 5,428,776 | 6/1995 | Rothfield | 395/600 |
| 5,437,027 | 7/1995 | Bannon et al. | 395/600 |
| 5,499,359 | 3/1996 | Vijaykumar | 395/600 |
| 5,499,371 | 3/1996 | Henninger et al. | 395/700 |
| 5,504,885 | 4/1996 | Alashqur | 395/600 |
| 5,596,746 | 1/1997 | Shen et al. | 395/612 |
| 5,615,362 | 3/1997 | Jensen et al. | 395/614 |

OTHER PUBLICATIONS

"A New Direction in DBMS" by Dr. Michael R. Stonebraker, DBMS (Feb. 1994), p. 50.

*Primary Examiner*—Thomas G. Black
*Assistant Examiner*—Jean M. Cornelus
*Attorney, Agent, or Firm*—Fliesler, Dubb, Meyer & Lovejoy

[57] ABSTRACT

A system and apparatus is disclosed which stores, retrieves and analyzes relational and non-relational data. An application program provides a data query statement containing both relational and non-relational portions to a relational server. In an embodiment, the query statement is a Structured Query Language ("SQL") CONTAINS stored procedure or CONTAINS function statement. The relational data server then provides the non-relational query to either a text queue or database management language ("DML") queue. A non-relational data server then accesses either the text queue or the DML queue. The non-relational data server obtains pointers to the non-relational data and stores them in a temporary table. The pointers and relational data portion are processed by the relational server to obtain the relational and non-relational data. In an embodiment, the non-relational data server is a text server including an engine, filter, lexer, data storage and word list.

16 Claims, 9 Drawing Sheets

Microfiche Appendix Included
(1 Microfiche, 55 Pages)

SYSTEM AND APPARATUS FOR STORAGE RETRIEVAL AND ANALYSIS OF RELATIONAL AND NON-RELATIONAL DATA

REFERENCE TO MICROFICHE APPENDIX

Reference is made herein to Microfiche Appendix A, entitled "Oracle TexTile Functional Specification, Oct. 11, 1995," reproduced within a total number of 1 microfiche and a total number of 55 frames.

COPYRIGHT LIMITED WAIVER NOTICE

Appendix A contains material which is subject to copyright protection. The copyright owner has no objection to the facsimile reproduction of the Appendix as it appears in the United States Patent and Trademark patent files or records, but otherwise reserves all copyright rights whatsoever.

BACKGROUND OF THE INVENTION

1. Field of the Invention

The present invention relates generally to a database management system and, more specifically, to the storage, retrieval and analysis of relational and non-relational data.

2. Description of the Related Art

A database management system provides for the storage, retrieval and analysis of data. Most modern business database management systems use a relational model.

The relational database model is based on the mathematical concept of a relation and is often implemented as a table. A particular relational database based on this model is defined using mathematically-based rules which indicate precisely which tables should be included. Data in the rows of a table form tuples. Data in each column of a table are attributes of the tuples. Data is stored in a plurality of tables, each of which corresponds to a set of tuples for common predefined attributes. A collection of related tables or relations in the database is known as a schema.

Typical examples of so called "relational" database management system applications are financial accounting database systems, airline reservation database systems, and inventory control database systems. An example of a relational database system is the Oracle7 database server, available from Oracle Corporation, 500 Oracle Parkway, Redwood Shores, Calif. 94065. Such a database system has a large installed base of units.

Other relational database systems are described in U.S. Pat. No. 5,437,027, entitled SYSTEM AND METHOD FOR DATABASE MANAGEMENT SUPPORTING OBJECT-ORIENTED PROGRAMMING, issued Jun. 25, 1995 and U.S. Pat. No. 5,412,804, entitled EXTENDING THE SEMANTICS OF THE OUTER JOIN OPERATOR FOR UN-NESTING QUERIES TO A DATABASE, issued May 2, 1995.

A data manipulation language, or "query language", for a relational database management system typically specifies operations upon one or more relations to create a new relation. For example, a "restriction" operation forms a subset of the rows in a table by applying a condition or "predicate", to the values in each row. A "projection" operation removes columns from the rows by forming a stream of rows with only specified columns. A "join" operation combines data from a first table with data from a second table, typically by applying a predicate comparing the values in a column of the second table.

The type of the predefined attribute information in a relational database is often limited in scope. Generally, attributes are constrained to numbers and American Standard Code for Information Interchange ("ASCII") text strings. In the past, this limitation has not been overly restrictive for traditional business data-processing applications. Traditional business data-processing applications generally do not require search mechanisms more complex than ASCII character and numerical matching and comparison.

The search mechanisms useful for traditional relational database applications do not operate as well for more complex non-relational data. A non-relational database is a database which cannot be related by mathematical expressions. Examples of non-relational database applications are computer-aided design and manufacturing database systems, software engineering database systems, multimedia information systems, graphic database systems, sound database systems, text document database systems, and expert database systems.

For example, a pattern-matching search for graphic data is very complicated. A graphical pattern-matching analysis is well beyond the capabilities of a typical relational database system. Also, a graphic data search must be described in a way that is clear to the user and possible for the database system to interpret and execute efficiently. Such a search may require modification of the relational database query language interpreter.

Databases containing text documents also require complicated searching specific to the text characteristics. A search of English text documents may require more complicated searching than a simple text comparison of the data. Further, an alternate search mechanism would be required for searching non-English text, such as Japanese documents. Searches through text databases may require 1) comparison of documents or formats other than plain text, 2) the ability to handle words spelled differently or entered into the database incorrectly, 3) the ability to search for words that may be included in the text document instead of words in the search query, and 4) different tenses of the same words. Text of languages that are not easily represented in plain text are often difficult to deal with in relational databases.

Advancing technology has driven an increased need to store, retrieve and analyze non-relational data in a database management system. This need presents a problem for database management system manufacturers, who are challenged with providing database systems that are compatible with existing systems that can store, retrieve and analyze non-relational data, as well as relational data.

One solution to this problem is a complete redesign of a database management system to include non-relational data types. This proposed solution is shown in FIG. 1. An example of this approach is the Montage Object-Relation Database Management System ("ORDBMS") as described at page 50, volume 7 number 2 of DBMS, February 1994. This database management system 1 is an implementation of the POSTGRES system developed by the University of California. Database management system 1 is based on object-oriented design principles and was designed to be a "razor" into which various data type or "blades" in database 5 can be incorporated.

A disadvantage of the database management system 1 is that the use of "blades" require extensive modification of relational and non-relational server 4 program code. Extending the database system through relational and non-relational server 4 program code limits the number of third-party software programs currently available for use with server 4. Also, there is a loss of continuity with earlier developed systems, which could lead to compatibility problems.

Further, upgrades to the relational and non-relational server 4 will require the entire database management system to be shut down, or in other words, the database management system 1 does not allow for "hot upgrades."

Also, designing database management system 1 requires a large amount of development resources and costs. Redesign requires retraining of system developers, application developers, and database administrators.

Still another disadvantage of the database management system 1 is that it requires the use of object-oriented Structured Query Language 3 ("SQL" 3) in application 2 to define and manipulate the extended data types. Thus, the database management system 1 does not operate within the strict SQL 92 completely relational model, as adopted by the American National Standards Institute in 1992. SQL 3 is not yet an approved standard. This limits acceptance of the solution by early adopters and application developers.

Thus, a database management system which stores, retrieves and analyzes relational and non-relational data using existing application software is desirable. Further, the database management system should be easily upgradable without requiring to shut down the entire system. The database management system should also be consistent with existing data manipulation languages, thereby reducing cost and time required in implementing and operating the database management system.

SUMMARY OF THE INVENTION

According to the present invention, a database management system providing relational and non-relational data is presented. The database management system has an input device receiving a request, and an output device providing data. A memory contains the relational data and non-relational data. A processing system, coupled to the memory, includes a relational server responsive to the request which outputs relational data. The processing system also includes a non-relational server, responsive to the request outputting non-relational data. According to another aspect of the present invention, the processing system further includes means for parsing the request or database query into a relational database query and a non-relational database query. Further, the relational server is responsive to an SQL CONTAINS procedure or function statement.

According to another aspect of the present invention, the processing system further includes a first queue coupled to the non-relational server for storing the non-relational database query. A second queue is coupled to the non-relational database server for storing non-relational database modification requests. A table is also coupled to the non-relational server and the relational server for storing a relational data pointer provided by the non-relational server.

According to still another aspect of the present invention, the relational server is an SQL database server and the non-relational server is a text server. The text server includes a text engine, filter, lexer, data store and word list.

An apparatus for providing relational and non-relational data according to the present invention is also provided. The apparatus comprises a memory containing relational data and non-relational data and means for receiving a query. Means for parsing the query into a relational portion and a non-relational portion is coupled to the means for receiving. Means for providing relational data from the memory responsive to the query relational portion is coupled to the parsing means and memory. Finally, means for providing non-relational data from the memory responsive to the query non-relational portion is coupled to the parsing means and memory.

According to another aspect of the invention, the means for providing relational data includes a relational server and the means for providing non-relational data includes a non-relational server.

A method for providing data from a database containing relational data and non-relational data according to the present invention is also provided. The method includes providing a Structured Query Language ("SQL") statement and parsing the SQL statement into a relational portion and a non-relational portion. The non-relational portion is then processed to obtain pointers to the non-relational data in the database. The non-relational pointers are then stored in a table and the relational portion is processed, along with the pointers to the non-relational data, to obtain the data.

According to another aspect of the invention, the SQL statement is an SQL 92 statement. Further, the SQL statement is a CONTAIN procedure or function statement.

According to another aspect of the invention, the method step for processing the non-relational portion further comprises the step of queuing the non-relational portion on a queue. The non-relational portion is then popped from the queue and the non-relational portion is processed by the non-relational server.

An article of manufacture is also provided according to the present invention. The article of manufacture includes a computer readable medium having computer readable program means embodied therein for obtaining data in a database containing relational and non-relational data. The computer readable code means in the article of manufacture comprises computer readable program code means for causing the computer to read a query statement having a relational portion and non-relational portion. Computer readable program code means for causing the computer to parse the query into a relational portion and non-relational portion is then provided. Computer readable program means also causes the computer to obtain relational data from the database responsive to the relational portion. Computer readable program code means then causes the computer to obtain a pointer to the non-relational data and responds to the non-relational portion by displaying the relational data and the non-relational data.

According to another aspect of the present invention, the query statement is an SQL 92 statement.

BRIEF DESCRIPTION OF THE DRAWING

Other objects and advantages of the invention will become apparent upon reading the following detailed description and upon reference to the drawing in which.

DETAILED DESCRIPTION OF THE INVENTION

I. Hardware and Software Configurations

Figure 1:
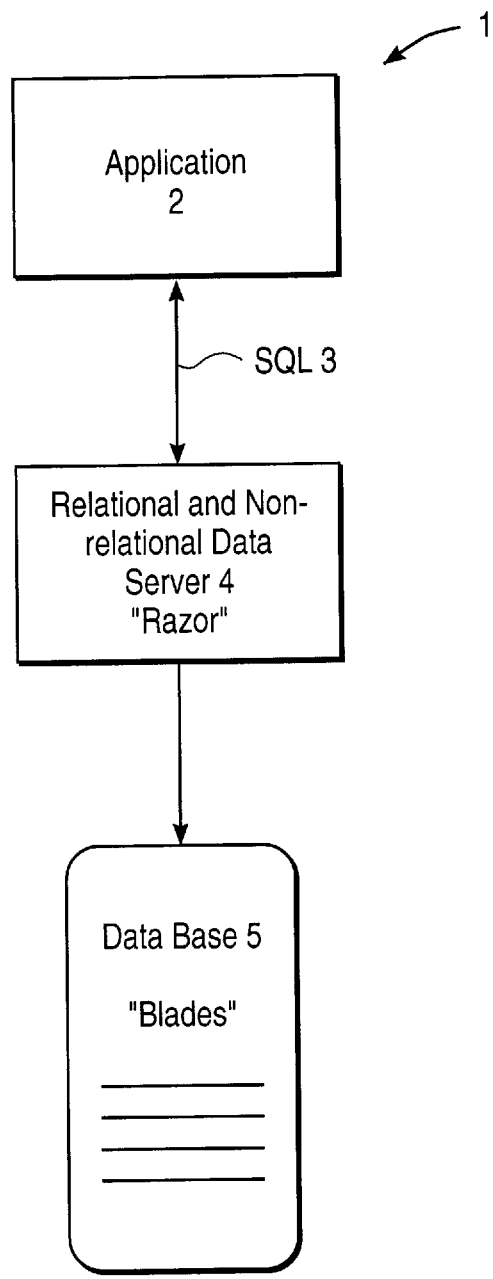
FIG. 1 is a block diagram of a prior art relational and non-relational database management system.
Figure 2:
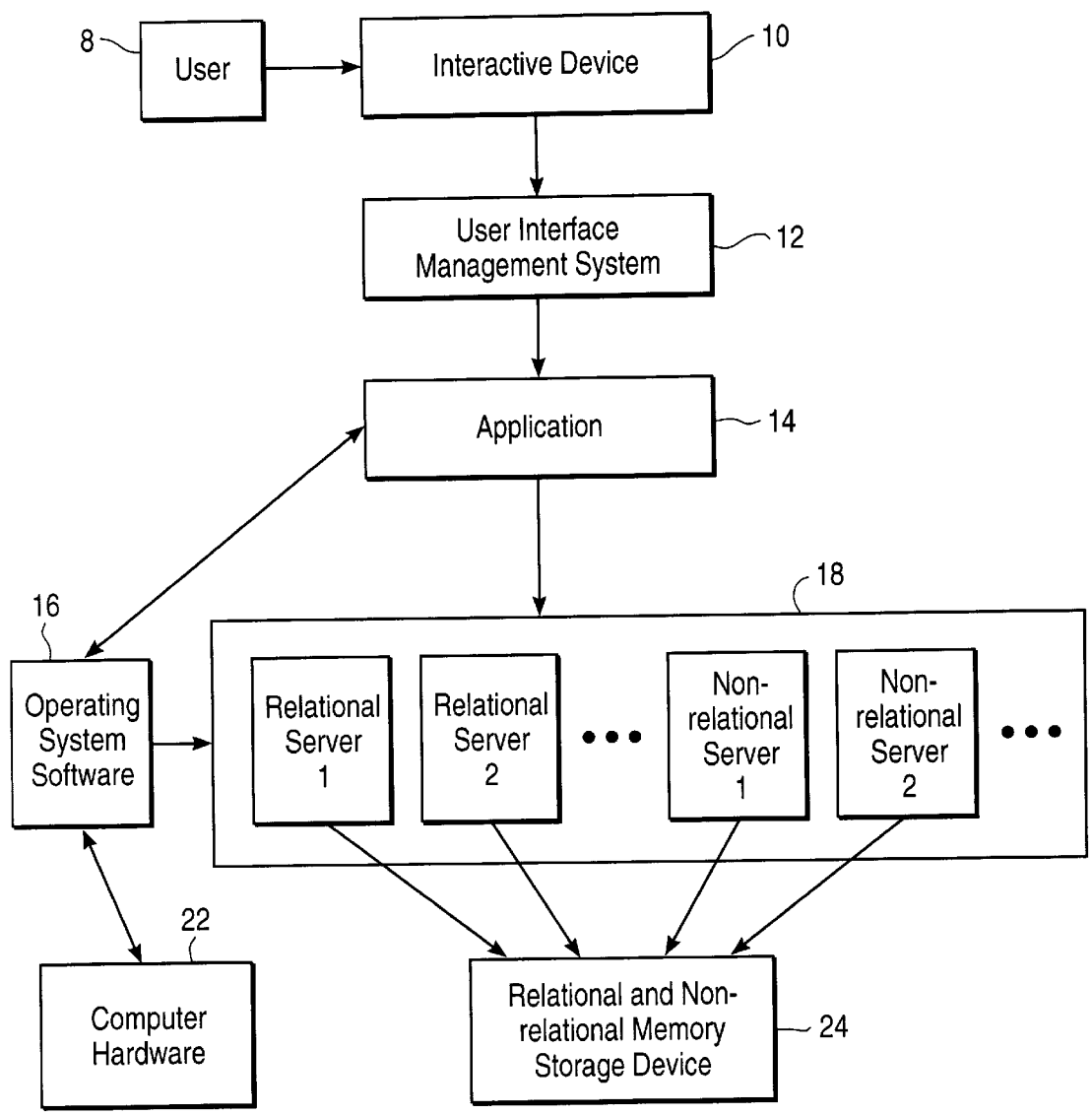
FIG. 2 is a block diagram of a hardware and software configuration embodiment according to the present invention.

FIG. 2 illustrates a block diagram of a hardware and software embodiment operating context of the present invention. A user 8, which may be human or another application, interacts with the interactive device 10 to send information to, and receive information from, user interface management system 12. Interactive device 10 may be communication hardware such as display, keyboard, or other data input and data output devices. User interface management system 12, which may be communication software, in turn sends the information to, and receives information from, an application software program 14. Application 14 interfaces with operating system software 16 and relational and non-relational database management system RDBMS 18.

RDBMS 18 includes at least one relational server and one non-relational server. A server is defined as a computer program running within a computer system which provides a service to other programs. RDBMS 18 stores, retrieves and analyzes objects created by application 14. RDBMS 18 interfaces with operating system software 16 to utilize various operation system services and with secondary memory storage device 24, typically a disk drive, to physically store and retrieve the objects created by application 14. Operating system 16 also interfaces with additional computer hardware 22, as necessary, to provide its system services to application 14, RDBMS 18 and secondary memory storage device 24.

While FIG. 2 illustrates a system embodiment of the present invention, RDBMS 18 may also be installed on a computer readable medium, such as a magnetic disk.

A. Hardware Configurations

RDBMS 18 may be implemented in many various hardware configurations, as described below. Computer hardware 22 in FIG. 2 represents the various hardware configurations. However, at least one server must be an Oracle7 instance.

1. SMP Machines

The RDBMS 18 takes advantage of the multiple processors in symetric multiprocessing ("SMP") machines. RDBMS 18 architecture provides near linear scale up with central processing units ("CPUs") as the number of concurrent users increases.

SMP machines allow RDBMS 18 to scale up with the addition of textual data. RDBMS 18 employs parallel query and parallel indexing enhancing performance over large text collections. Striping data over disk drives and multiple CPUs are required for an optimal parallel configuration.

2. Network

Non-relational servers do not need to be on the same machine as an Oracle7 instance. A non-relational server could be on another machine and access Oracle7 through a network using, for example, SQL*Net. Work can be balanced between two or more machines. The speed of the network connection would, of course, be a factor for query and indexing performance.

3. MPP

RDBMS 18 also takes advantage of multiple processors and multiple nodes in massively parallel processing ("MPP") machines. Scaling issues are similar to SMP machines, but more configuration options are possible with MPP machines. For example, Oracle7 instances could reside on some nodes while non-relational servers could reside on other nodes. Alternatively, groups of Oracle7 instances and non-relational servers could be sprinkled on the separate nodes. In all cases, a non-relational server should simply piggy-back on an Oracle7 parallel server. More CPUs are generally available within MPP machines; therefore, they are ideal for parallel query and parallel indexing. Striping data over disk drives is required for optimal parallel configuration.

4. Distributed

Non-relational servers rely on Oracle7's distributed capabilities. Non-relational servers place no limitations on Oracle7 SQL; therefore, RDBMS 18 fully supports distributed queries, two-phase commit, and replication.

B. Platform/Operating System Software

Platforms, or operating system software 16, for RDBMS 18 include the major UNIX platforms, the UNIX workgroup platforms, and the proprietary workgroup platforms. Massively parallel platforms may also be used. For example, the following platforms could be used: 1) HP-UX; 2) IBM AIX; 3) Sun SunOS 4.1.3; 4) Sun Solaris 2.4; 5) DEC UNIX (formerly known as OSF/1); 6) Sequent PTX; 7) Pyramid; 8) DG-Aviion; 9) SCO Unix; 10) Unix Ware; 11) Sun Solaris x 86; 12) Microsoft NT; 13) Novell Netware; 14) IBM OS/2; 15) IBM SP-2; 16) nCube; 17) NCR 3600; and 18) Cray SuperServer 6400.

C. Application Programming Environments

In one embodiment, user interface management system 12 is Microsoft Windows. Windows application development tools, such as Oracle Forms, Oracle Power Objects, and Microsoft Visual Basic, may also be used.

Oracle programming environments, including the Oracle Call Interface ("OCI"), Pro*C, User Programmer Interface ("UPI"), and Procedural Language/Structured Query Language ("PL/SQL"), may be used to develop application software 14. The non-transparent query method, involving calling the CONTAINS PL/SQL procedure directly, described in detail below, can be used from any of these environments with any version of an SQL server as a relational server in RDBMS 18. Similarly, non-relational queries can be performed in all of Oracle's programming environments using an alternative transparent query method described in detail below.

II. Data Model

A. Overview

Figure 3:
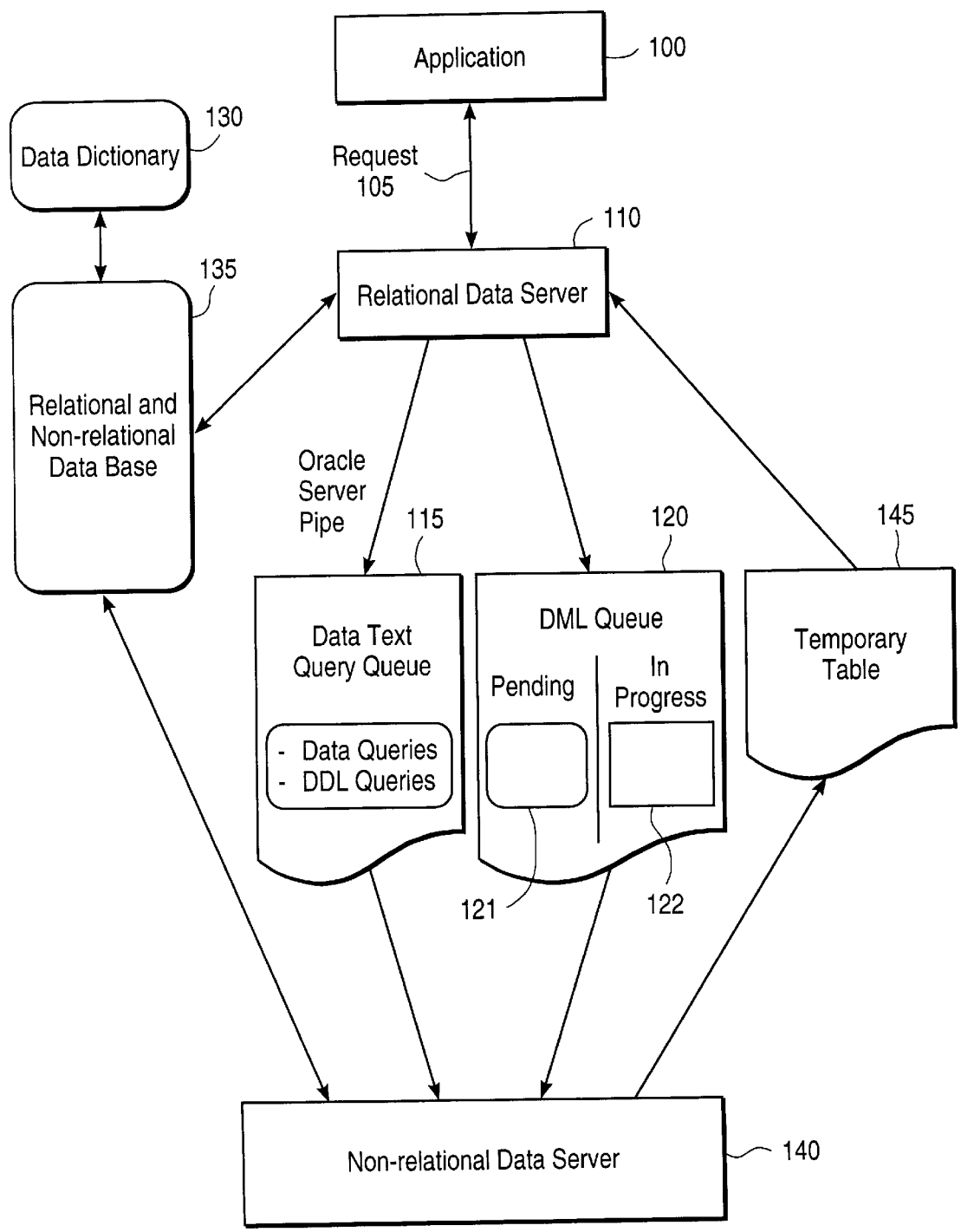
FIG. 3 is a block diagram of an embodiment of a relational and non-relational database management system according to the present invention.

The following describes a general data flow according to the present invention with a more detailed description provided below. A functional specification describing an embodiment of the present invention entitled "Oracle TexTile Functional Specification, Oct. 11, 1995" is attached as Appendix A. FIG. 3 is a block diagram which depicts an embodiment of the present invention. FIG. 3 illustrates RDBMS 18 shown in FIG. 2. Relational and non-relational data is stored in relational and non-relational database 135. The characteristics of the attributes stored in database 135 are stored in a data dictionary 130. Data in database 135 has relational and non-relational attributes. A software application 100 provides a request 105 to the relational data server 110. In the preferred embodiment, relational sever 110 is an Oracle7 ver 7.3 SQL relational data server. Request 105 can be a request for data (Data Query), or an instruction to create and maintain indexes (Data Definition Language ("DDL") Request), or an instruction to modify data (Data Management Language ("DML") Event). In the preferred embodiment, request 105 may be a CONTAINS stored procedure or CONTAINS function in an SQL statement. If request 105 involves non-relational attributes, relational data server 110 parses and non-relational portions and produces a non-relational query. In the preferred embodiment, the non-relational query portion will be either a Data Query, DDL Request, or DML Event.

If the non-relational query portion is a Data Query or DDL Request, the query is placed on the Data Query Queue 115. A non-relational data server 140 configured to satisfy that type of non-relational query (Data Query or DDL Request) takes the non-relational query from the Data Query Queue 115, and processes the non-relational query. Results are stored in temporary table 145. Relational data server 110 processes the relational component of query 105. Relational data server 110 executes the relational query that makes use of the data in temporary table 145, and reports the results to application 100.

If the non-relational request is a DML Event, the request is placed on DML Queue 120 in pending table 121. A non-relational data server 140 configured to satisfy DML Events transfers the request from the pending table 121 to the In Progress Table 122 while the request is being processed. When the DML Event is complete, appropriate result information is communicated to application 100.

While FIG. 3 shows one relational server and one non-relational server, other embodiments could include multiple relational and non-relational servers.

Figure 3A:
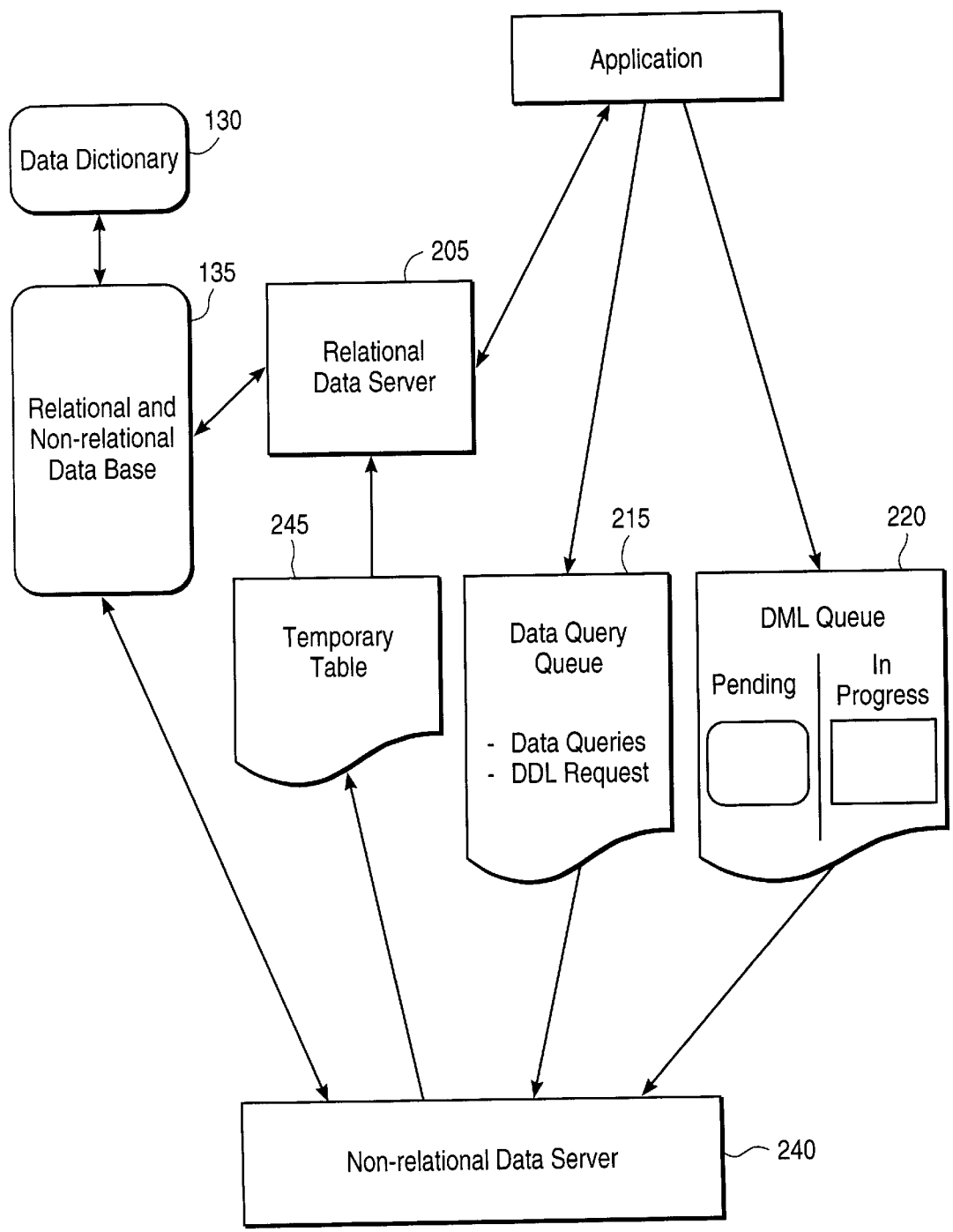
FIG. 3a is a block diagram of another embodiment of a relational and non-relational database management system according to the present invention.

FIG. 3a is a block diagram which depicts another embodiment of the present invention. Similarly, data in database 135 has relational and non-relational attributes. Application 100 has a query that involves non-relational attributes of database 135. Application 200 places a non-relational query on either Data Query Queue 215 or DML Queue 220.

A non-relational database server 240 configured to satisfy that type of non-relational query (Data Query, DDL Request, or DML Event) takes a non-relational request from Data Query Queue 215 or DML Queue 220, and processes the non-relational request. Query results are stored in temporary table 245. Application 100 provides a query to relational data server 205 that makes use of the data in the temporary table 245, and reports the results to application 100.

B. Relational and Non-relational Database: Text Columns

Figure 4:
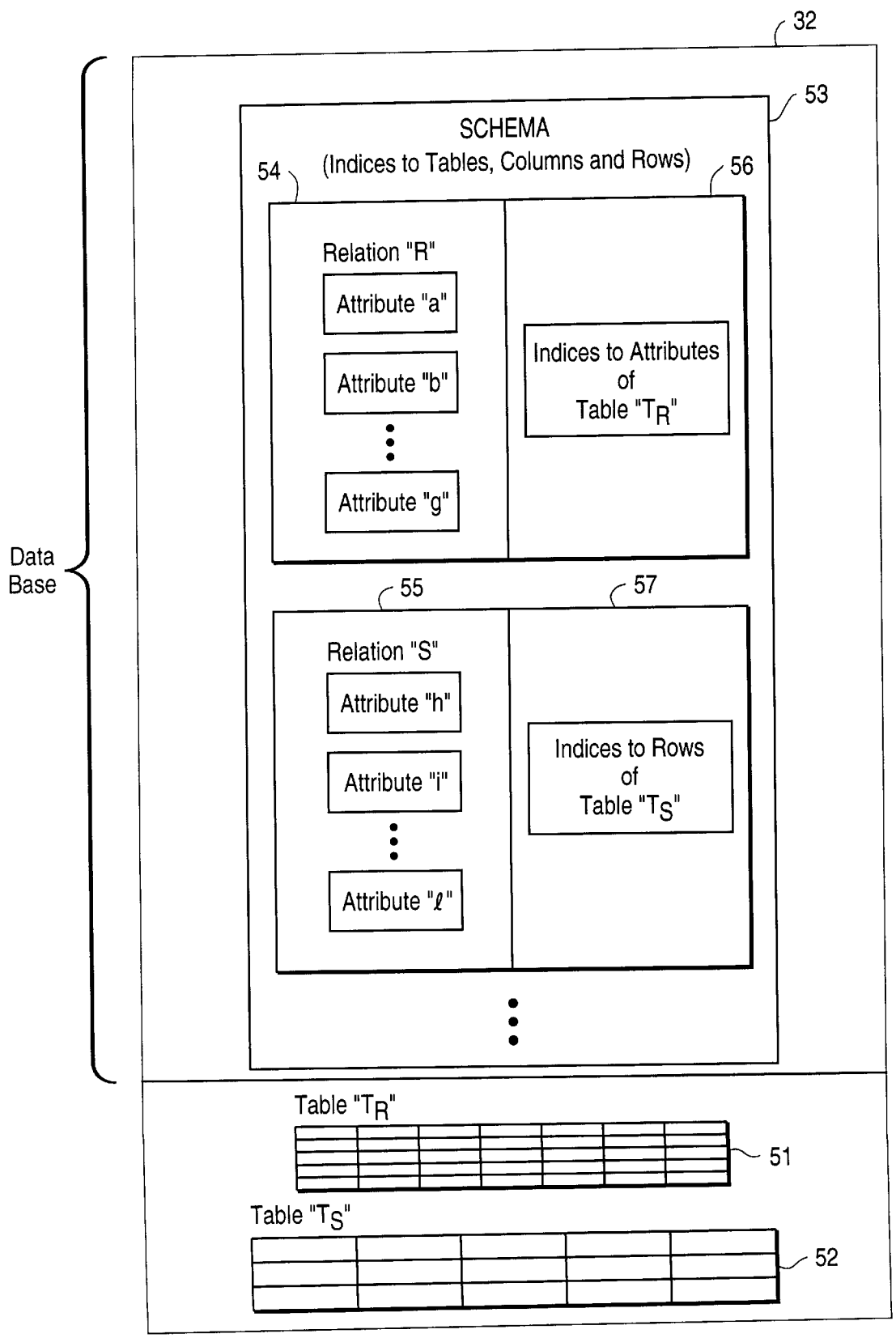
FIG. 4 is a block diagram of a relational database according to the present invention.

Turning now to FIG. 4, there is shown a detailed representation of a relational database 32 in relational and non-relational database 135, shown in FIG. 3. Relational database 32 includes data stored in a number of tables, such as the tables 51 and 52. Each table corresponds to a particular relation in the relational database. Table 51, for example, corresponds to a relation "R" and table 52 corresponds to a relation "S". Each table is shown as a rectangular matrix of rows and columns. Internally, however, data could be stored in any number of ways. Each row, for example, could be stored as a record of a file. Alternatively, the data in each of the tables could be freely dispersed in memory, and the rows and columns could be defined by lists of pointers to the data. In any event, the data structures storing the data in the tables 51 and 52 permit all of the rows in a table to be accessed sequentially and further permit a specified column position of an accessed row to be indexed.

Each column in each of the tables is labeled by a key called an attribute. Most conventional database query languages assign an alphanumeric relation name to each table and further assign an alphanumeric attribute name associated with one table which need not be distinct from the attribute name of another table. A particular column of data, however, can be uniquely specified by the combination or concatenation of both a relation name and an attribute name.

To speed up access to the rows of the tables, the relational database 32 further includes a number of indices for columns of tables. These indices, along with their corresponding table information, are stored in what is known as a schema, such as schema 53. For example, schema 53 contains index 56 to relation "R" of the first table 51, and an index 57 to the relation "S" for the second table 52. The relation "R" is stored in schema 53 as rows of values for attributes named "a", "b", "c", "d", "e", "f", "g" corresponding to each column of the table R, and the relation "g" is stored in schema 53 as rows of values for attributes named "h", "i", "j", "k", "l" corresponding to each column of the table S. The indexes 54 and 55, for example, provide for a numerical pointer or location address to be obtained for rapid access to table entries given the table and column names.

For processing certain relational operations, it is only necessary to scan sequentially through all of the rows of a table. To facilitate the selection and retrieval of a particular row, however, it is desirable to identify one or more columns of the table as including keys to the individual rows. Some operating systems, for example, have optimized procedures for storing tables in files according to a primary key and for retrieving a row or record specified by the primary key. In such systems, if the user does not specify a column as including the primary key, the system may nevertheless assign a primary key to each row. In such a case, the primary key is known as a "surrogate column" which, if not accessible to the user, will be accessible to the computer programmer.

In an embodiment, non-relational data server 140 in FIG. 3 is a text server. In this embodiment, any standard column within any standard table may be used as a text column in database 135. Text columns are of data type CHAR, VARCHAR2, LONG, or LONG RAW. Text columns have a policy attached to them. Text, or documents, are usually stored directly in a text column. The one exception is external text.

External text is text that is stored in operating system file system, not in database 135. In the present invention, this is considered an indirect data store. The column that is defined to the system as the text column does not directly store the text but rather stores the name of the operating system file which contains the text.

C. Data Dictionary

Data dictionary 130 in FIG. 3 registers non-relational data components (objects) and stores the preferences for those components. Policies are logical groupings of non-relational data components and are defined and stored within data dictionary 130. In an embodiment, each column has at least one policy assigned to it. Data dictionary 130 also manages user preferences, resource limits and non-relational data server 140 status.

1. Non-relational Components and their Preferences

Figure 5:
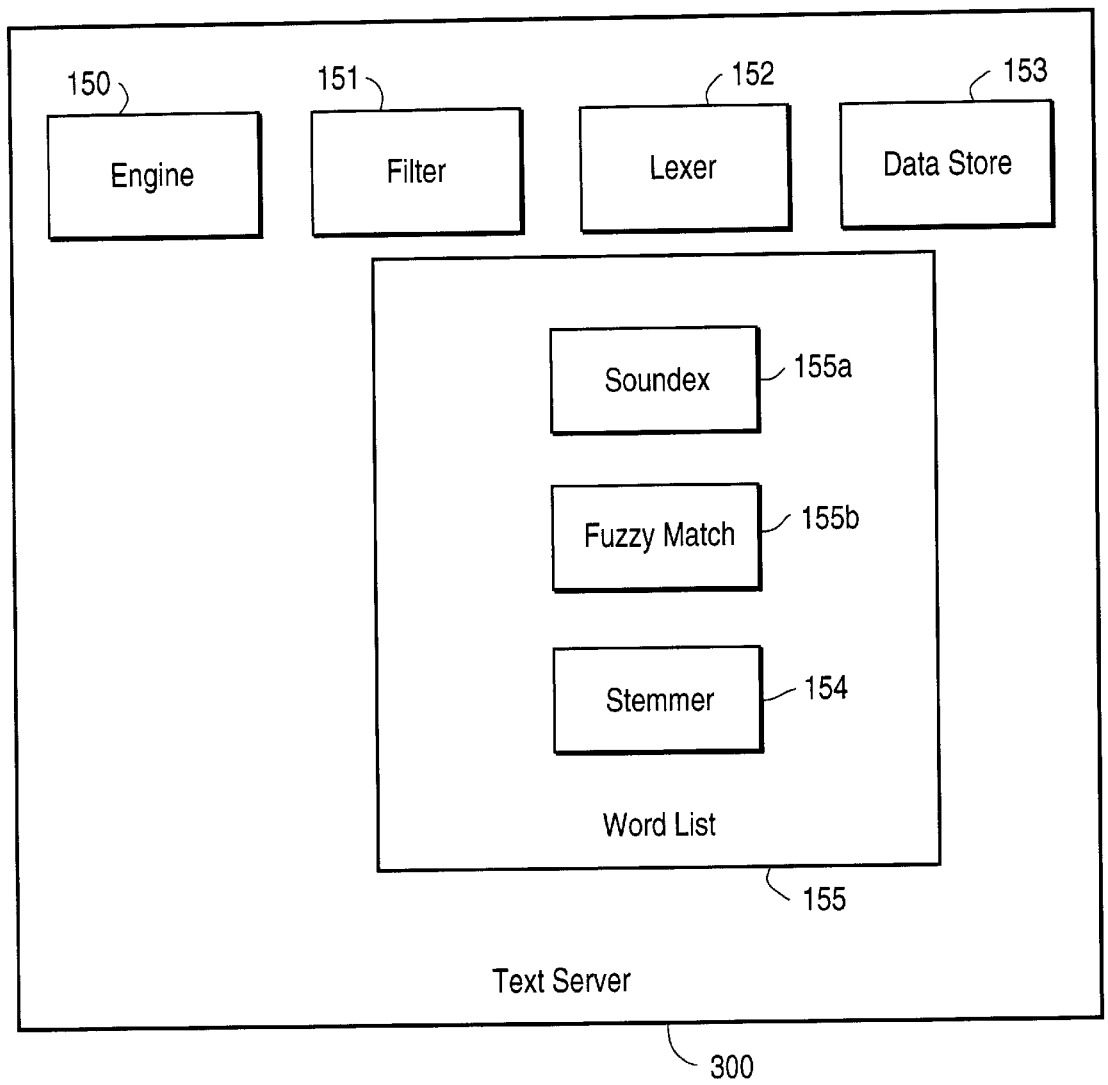
FIG. 5 is a block diagram of a non-relational text server according to the present invention.

In a text server embodiment, the replaceable components in non-relational data server 140 are Engines, Filters, Lexers, Data Stores and Word Lists (Stemmers, Soundex and Fuzzy Match), as seen in FIG. 5 and described in detail below. Each component must be registered with the data dictionary 130.

Preferences and attributes are also defined in data dictionary 130. Preferences and attributes can be set for each of these components. For example, the English Fuzzy Match component has a preference to choose between tuning for typewritten text or for text which has resulted from a scan and Optical Character Recognition ("OCR") process. All preference attributes have default values.

2. Policy

A non-relational server policy is a logical grouping of components and their preference attribute settings. In the text server embodiment, every text column that will be indexed by a text server must be assigned a policy. For example, consider a table with two text columns: one holds English Microsoft Word documents and the other holds Japanese plain text comments.

The example table schema looks like this:
Table: DOC_AND_COMMENT
Columns: TEXTKEY number (unique primary key)
TEXTDATE date
AUTHOR varchar2(50)
COMMENTS varchar2(2000) (text column storing Japanese ASCII)
DOC long raw (text column storing English MS-Word)

Two text server policies are created; one for the DOC column and one for the COMMENTS column. The policies look like this:

Policy name: I_DOC
Column: <schema>.DOC_AND_COMMENT.DOC
Engine: Text General Purpose Engine
Filter: MS-Word
Lexer: Text General Purpose Lexer
Data Store: Direct
Stemmer: English Stemmer
Word List: English Soundex, English and typewritten Fuzzy Match Policy name: I_COMMENTS
Column: <schema>.DOC_AND_COMMENT.COMMENTS
Engine: Specialized Japanese Engine
Filter: None
Lexer: Specialized Japanese Lexer
Data Store: Direct
Stemmer: None
Word List: Japanese Soundex, Japanese and typewritten Fuzzy Match The mix-and-match approach of a text server policy definitions gives the application developer flexibility and encourages modular design when developing text applications.

3. Users

In an embodiment, a text server 300 relies on an Oracle7 data dictionary to track and manage users. The text data dictionary stores a minimal amount of information about users. The data dictionary stores preference information for a user. There are three preferences:

Default penetration—A user may specify default penetration operators which are automatically used on every query.
Thesaurus—Which thesaurus does the user prefer?
Concept Dictionary—Which concept dictionary does the user prefer?

In the text server embodiment, data dictionary 130 also stores specific resource usage information. Resource information includes:

1. Maximum number of temporary tables 145 available.
2. The share level of temporary tables. Share levels describe whether temporary tables may be shared, for example, between sessions or schemas.

A text data dictionary also tracks a unique session identifier for every user calling text server 300. This aids tracking and cleanup.

3. Servers

Data dictionary 130 also stores information necessary to track various non-relational servers. The non-relational server attributes tracked are Server Name and Server Status. Non-relational servers can have the following status:

1) INIT, Initializing itself; IDLE, Idle; waiting for a text request; RUN, Handling a request; PAUSE, Paused; will not resume operation until it receives a CONTINUE prompt; SHUTTING_DOWN, Shutting down; EXIT_NORMAL, Exited with a normal or immediate shutdown operation; EXIT_ABORT, Exited with a shutdown abort operation.

III. Process Model: Text Server

The following describes the process model of a text server embodiment of the present invention. It should be understood that other non-relational servers may be implemented likewise.

A. Text Server

Text server 300, shown in FIG. 5, is a shared server which is designed to handle text functions, and only text functions. Text server 300 may be implemented as non-relational data server 140 as shown in FIGS. 3 and 2. A text server process mirrors a shared SQL server, or relational server counterparts, only processing the textual part of a query or SQL request. In an embodiment, the textual component of an SQL request can be one of three types: 1) Text queries (using the CONTAINS function or procedure), 2) DDL Requests (create index, drop index, etc.), or 3) DML Events (normal inserts, updates, and deletes).

At system startup, a configurable number of text servers 300 are started. These text servers listen for text requests. Text requests can come from two different logical queues, Data Text Queue 115 and DML Queue 120 as seen in FIG. 3. The non-relational portion of SQL queries and non-relational DDL statements get pushed onto Data Text Queue 115. In the preferred embodiment, an Oracle7 server pipe is used in the implementation. Text server 300 then pops the requests off Data Text Queue 115 and performs the requested operation.

DML events get communicated to the text server 300 through DML Queue 120. Any insertion, update, or deletion of text must also notify text server 300 through DML Queue 120. This is usually done through a simple trigger on a table containing the text column. In a preferred embodiment, DML Queue 120 consists of two standard Oracle tables.

Individual text servers may be started with a personality mask such that they are dedicated to a certain task, or group of tasks. The text server personalities are:

1. DBA. This personality allows a text server to startup new text servers, to perform client and server failure detection and correction, and to perform system garbage collection.
2. DML. This personality allows a text server to service non-relational DML requests.
3. QUERY. This personality allows a text server to run text queries.
4. DDL. This personality allows a Text Server to service non-relational DDL requests.

All text servers automatically take on the DBA personality. This prevents a single point of failure in a multi-server configuration. Text Servers can have one or more of the personalities DML, QUERY, and DDL. In a preferred embodiment, a non-relational database system according to the present invention should be started with at least one server having the QUERY personality, so the simplest configuration is one text server with the {DBA, QUERY} personality mask.

B. Text Queue

An SQL query statement (a select statement) which includes a CONTAINS function in the WHERE clause will dispatch the text query to text queue 115. Likewise, DDL Request statements, such as create index, drop index, and create policy, will also dispatch the operation to the text queue 115.

Whether it is the textual component of an SQL query or a non-relational database DDL Request statement that is dispatched to text queue 115, the first available text server (with the proper personality mask) will pick up the request. After getting the request, the text server will perform the operation and notify the calling client or application of its completion.

1. DDL Process

Figure 6:
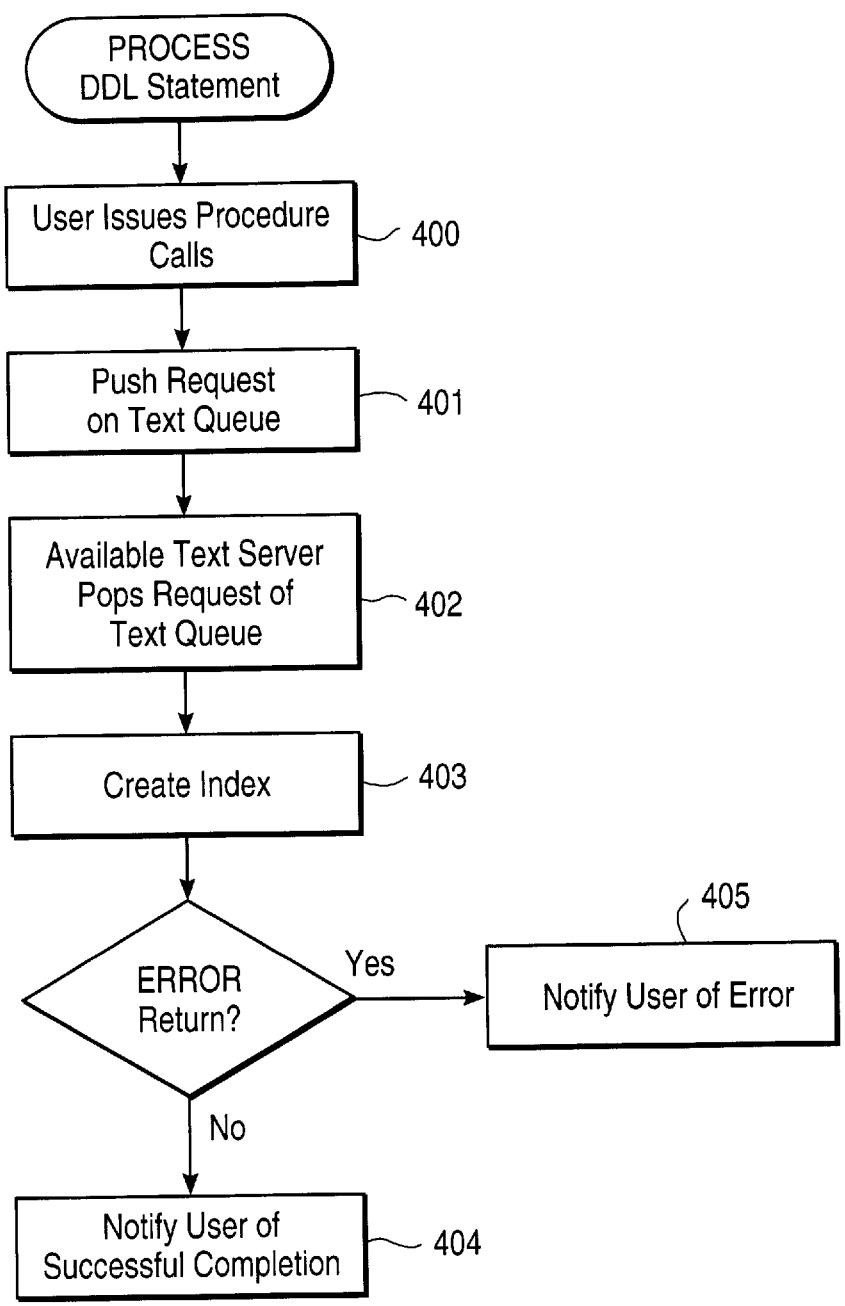
FIG. 6 is a logic flowchart for processing a Data Definition Language ("DDL") statement according to the present invention.

The steps of processing a non-relational database DDL Request statement is illustrated in FIG. 6.

A user or application 100 issues the following procedure calls in step 400:

execute dr_ddl.create_policy('I_TEXT', 'TEXTTAB.TEXT');

execute dr_ddl.create_index('I_TEXT').

The request to create a non-relational database index, identified by policy I_TEXT, for text column TEXT in table TEXTTAB is pushed onto text queue 115 in step 401.

An available text server pops the request off text queue 115 in step 402 and creates the index in step 403.

A text server notifies the user of successful completion in step 404 or notifies user that there was an error and the indexing was not completed in step 405.

a. DDL Services

The non-relational and relational database management system according to the present invention provides DDL services for application developers to define, create, and maintain text indexes. The following DDL services are provided:

1. CREATE_POLICY. Creates a new policy.
2. DROP_POLICY. Drops a policy. If the policy has already been assigned to a text column the text index will also be dropped.
3. UPDATE_POLICY. Updates a policy. If the policy being updated has already been assigned to a text column the updated policy will become a new policy with a different name. The old policy will remain intact.
4. CREATE_PREFERENCE. Creates a new preference. This procedure will return an error if there are invalid attribute values.
5. DROP_PREFERENCE. Deletes a preference. This procedure will return an error if the preference being deleted is referenced by a policy. The preference will not be deleted.
6. UPDATE_PREFERENCE. Updates a preference. This procedure will return an error if the preference being updated is being referenced by a policy. The preference will not be updated.
7. CREATE_INDEX. Creates the text index for a text column.
8. DROP_INDEX. Drops the text index for a text column.
9. OPTIMIZE_INDEX. Optimizes the text index for a text column.
10. SYNC. Synchronizes the system to a particular point in time. The sync service causes nothing to actually happen, it just waits for rows sitting in the DML Queue to be processed.

2. Textual Query Process

There are two methods for running non-relational queries, and in particular, text queries. The first is using the CONTAINS functions, which is transparent to the application, and the second method, a non-transparent method to the application, is using the CONTAINS stored procedure. An example of using the CONTAINS and SCORE functions is below:

select SCORE(TEXT) SCORE, TEXTDATE, AUTHOR, TITLE from TEXTTAB where contains ('TEXTTAB.TEXT', 'oracle and database')>0 and TEXTDATE between '01-APR-95' and '10-APR-95' order by SCORE desc The CONTAINS procedure is part of package DR_QUERY and has the following definition:

```
PROCEDURE CONTAINS(
    POLICY_NAME     VARCHAR2,
    TEXT_QUERY      VARCHAR2,
    RESTAB          VARCHAR2,
    SHARELEVEL      NUMBER default 0,
    QUERY_ID        NUMBER default NULL,
    CURSOR_ID       NUMBER default NULL)
```

Where POLICY_NAME is the full qualified name of a text column and RESTAB is a result table with the following layout:

<key><score>[<contains_id>]

Whether the result table has a value for <contains_id> will depend on the number of CONTAINS functions in the query and the SHARE level. If a user's CONTAINS functions share a result table then <contains_id> will be included. If a user's CONTAINS functions do not share a result table then <contains_id> will not be included.

As an example of using the CONTAINS procedure, consider the following table:

TABLE 1

| Table | TEXTTAB | |
|---|---|---|
| Columns | TEXTKEY | number (unique primary key) |
| | TEXTDATE | date |
| | AUTHOR | varchar2(50) |
| | TITLE | varchar2(100) |
| | TEXT | long (text column with direct text storage) |

Running a text query for the terms 'oracle and database', that will return TEXTDATE, AUTHOR, and TITLE would be done in the following manner (assume I_TEXT is the policy for text column TEXTTAB.TEXT):

execute DR_QUERY.CONTAINS ('I_TEXT', 'oracle and database', 'DR_TEMP',0);

select SCORE, TEXTDATE, AUTHOR, TITLE from TEXTTAB, DR_TEMP where TEXTTAB.TEXTKEY=DR_TEMP.TEXTKEY order by SCORE desc;

a. Temporary Tables

In the above example, DR_TEMP is temporary table 145 in FIG. 3. Temporary tables store intermediate results of text queries. These intermediate results, or pointers, are then merged into the standard SQL query through a join operation or a sub-query operation. Temporary tables can be named anything but must have the following schema:

Table: DR_TEMP

Columns: TEXTKEY varchar2(64)
SCORE number
CONID number b. Score Function

The general purpose text engine returns a relevance score for each text column row intersection which is retrieved by a text search. Each row returned is given a score between 1 and 100. The score is a measure of how relevant the text contained in that row was with respect to the given query. Scoring of results is discussed further in the next section.

c. Text Processing Example

Figure 7:
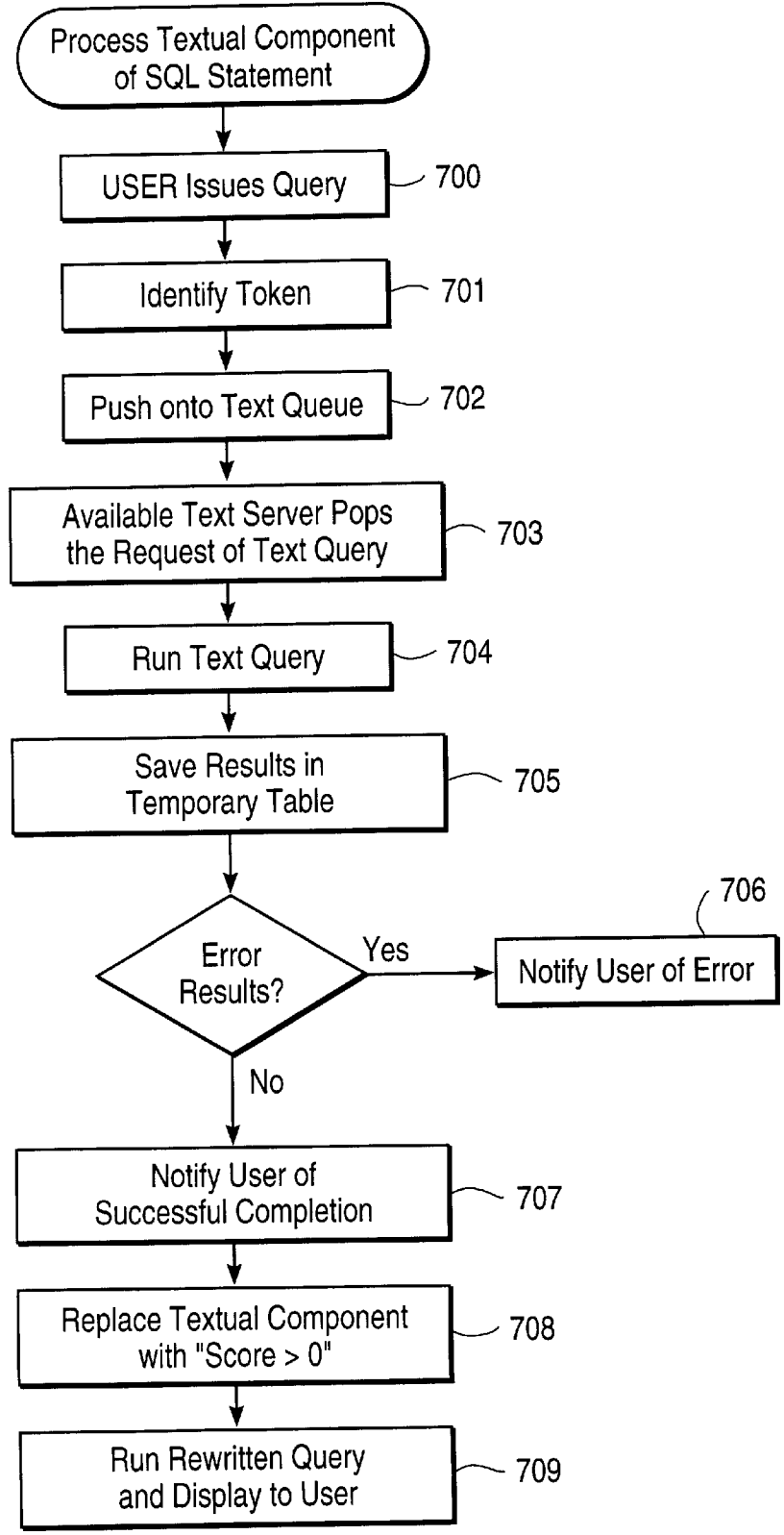
FIG. 7 is a logic flowchart for processing a query according to the present invention.

The steps of processing the textual component of an SQL query is illustrated in FIG. 7.

A user runs the following query in step 700:

select TEXTDATE, AUTHOR, TITLE from TEXTTAB where contains (TEXT, 'oracle and database')>0 and TEXTDATE between '01-APR-95' and '10-APR-95'.

The textual component of the query, find the tokens "oracle and database" within the text column TEXT in step 701, is pushed onto the text queue 115 in step 702.

An available text server, for example, text server 300, pops the request off text queue 115 in step 703 and runs the text query in step 704.

After the query has been run, text server 300 saves the results to temporary table 145 in step 705, DR_TEMP for this example. The results are the primary keys from table TEXTTAB which satisfy the text query and the corresponding score of each returned row.

Text server 300 notifies the user of successful completion in step 707 or error in step 706.

The textual component of the query, "contains(TEXT, 'oracle and database')", gets replaced or rewritten with the following: "SCORE" in step 708. This rewriting is done by the SQL interpreter which is discussed in the next section.

The following query gets run with the results being displayed to the user or application in step 709:

select TEXTDATE, AUTHOR, TITLE from TEXTTAB_VIEW TEXTTAB where SCORE>0 and TEXTDATE between '01-APR-95' and '10-APR-95'.

TEXTTAB_VIEW is a view of TEXTTAB joined with the DR_TEMP to expose the SCORE column. This will be explained further below.

C. The Text Query Rewrite

Content based search capabilities (text retrieval capabilities) are utilized through a set of PL/SQL functions called from various clauses of an SQL query statement. According to one embodiment, a relational data server 110 as shown in FIG. 3, or for example an SQL server, will rewrite queries which include SQL CONTAINS and SCORE function calls. This allows text search and retrieval to be performed from any Oracle interface. The following describes the CONTAINS, SCORE and DISPLAY functions in detail.

1. The CONTAINS Function

The CONTAINS function applies a text query, contained in a string argument, to a text column. It has two variants illustrated in Table 2.

TABLE 2

FUNCTION CONTAINS(COLUMN $TEXT_COLUMN,
/*Not a PL/SQL type */
TEXT_QUERY STRING,
LABEL INTEGER default0)
returns number;
FUNCTION CONTAINS(COLUMN $TEXT_COLUMN,
/*Not a PL/SQL type */
TEXT_QUERY_BIND INTEGER,
LABEL, INTEGER default 0)
returns number;

COLUMN—The name of a valid base table or view text column.
TEXT_QUERY—The text query string. The text query must be a literal string, no string expressions allowed.
LABEL—An optional numeric parameter to differentiate between multiple CONTAINS applied to the same column.
TEXT_QUERY_BIND—A numeric identified for late binding of a text query. A text query string may be bound after parsing and before execution.

The CONTAINS function may only appear in the WHERE clause of a SELECT statement. The CONTAINS function may not be used in the WHERE clause of an UPDATE, INSERT, or DELETE statement.

2. The SCORE Function

The SCORE function returns a relevance score for its text column operand. The SCORE function syntax is illustrated in Table 3.

TABLE 3

FUNCTION SCORE( COLUMN $TEXT_COLUMN
/*Not a PL/SQL type*/
LABEL INTEGER default NULL
returns INTEGER COLUMN—The name of a text column that is also the operand of a CONTAINS function in the same statement and corresponding WHERE.
LABEL—Optional, must match the label value of a corresponding CONTAINS.

The SCORE function may only be called from an SQL SELECT list, ORDER BY, GROUP BY or HAVING expression. The SCORE function must have a corresponding CONTAINS function clause. For optimal execution, users will alias SCORE in the select list and refer to that alias in other clauses (the query optimizer does not detect common sub-expressions). The SCORE function will return 0 for documents that were not selected by its corresponding CONTAINS function.

3. The DISPLAY Function

The DISPLAY function is used to return a specific number of filtered characters of a text column. The syntax of the DISPLAY function is illustrated in Table 4.

TABLE 4

FUNCTION DISPLAY( COLUMN $TEXT_COLUMN,
/*Not a PL/SQL type */
LENGTH INTEGER default 40,
OFFSET INTEGER default 0,
WHITE1 INTEGER default 1)
returns VARCHAR2;

COLUMN—is a valid text column.
LENGTH—optional, the desired length of the returned string.
OFFSET—optional, where to start the returned string.
WHITE1—optional, substitute sequences of white spaces with single blanks. The default setting is 1 (yes), to disable set to NULL or 0.

4. The Rewrite Process

Figure 8:
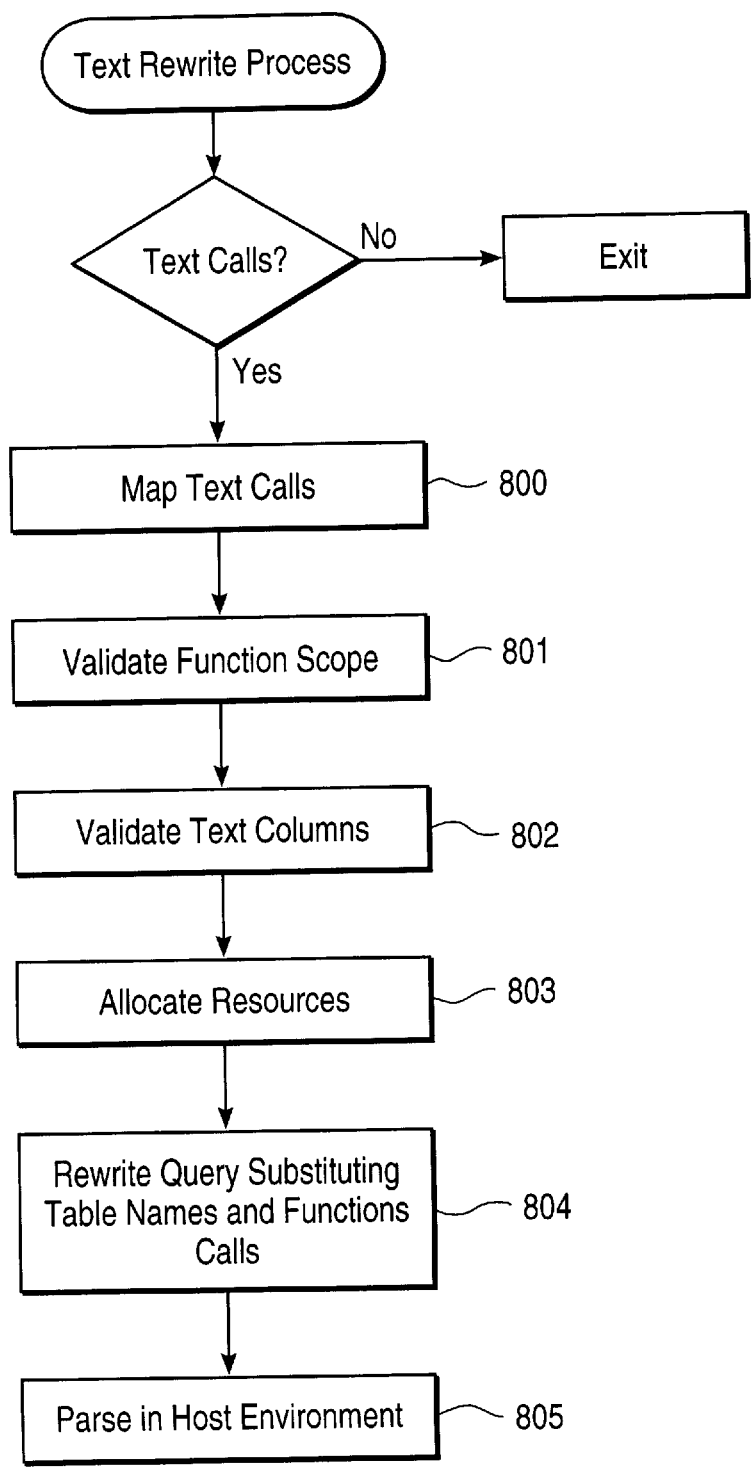
FIG. 8 is a logic flowchart for processing a textual component of an SQL query according to the present invention.

SQL statements according to the present invention incorporating non-relational database functions are valid SQL statements which get rewritten by a relational data server 110 or, for example an SQL server, for execution and performance purposes. At SQL query statement parse stage (parse in OCI), a text query rewrite will map out the desired functions and execute the steps illustrated in FIG. 8.

Map text calls in SQL statement in step 800, if no calls detected, exit.

Validate functions scope and match functions called from proper clauses in step 801.

Validate text column arguments in step 802.

Allocate resources in step 803 (temporary tables and packages required for statement execution).

Rewrite query substituting the table names and each function call in step 804. Rewrite substitutions is described in detail below.

Proceed with rewritten statement parsing in the database.

If an error is found at any stage, it must be reported and the rewrite process will stop.

5. Rewrite Substitutions

This section describes the substitutions that the text query rewrite process described above makes when mapping non-relational database functions to SQL clauses which will give the proper results and are optimized for performance. The following substitutions are made:

a. Table Names

Table names in the FROM clause of a SELECT statement get substituted if they are an operand to a CONTAINS function. They are substituted with the name of the view which relational server 110, and in particular an SQL server, creates on the fly. The view is a join of the text table to the temporary results table. The main purpose of the view is to expose the SCORE column, or columns, from the temporary results tables.

b. Contains

CONTAINS(COLUMN, TEXT_QUERY,LABEL) is
  substituted by:
  SCORE
  Where:
    SCORE is the column from the temporary results table. If more than one score is required then a number will be appended to the column name (SCORE1, SCORE2, SCORE3, etc.).

C. Score

SCORE(RESUME,LABEL) is substituted by:
  SCORE
  Where:
    SCORE is the column from the view of the base table and the temporary results table. If more than one score is required then a number will be appended to the column name (SCORE1, SCORE2, SCORE3, etc.)

d. Display

DISPLAY(COLUMN , . . . ) is substituted by:
  DISPLAY(POLICY, . . . )
  DISPLAY—(the rewrite) is an overload of the original display.
  POLICY—The policy name associated with the text column COLUMN.

D. DML Queue

The non-relational database DML queue 120 is used to notify the non-relational data server 140 of changes made to data in a text column. The non-relational database DML queue 120 is comprised of two tables, the pending table 121 and the in-progress table 122. Rows are placed in the DML queue 120 by a trigger which is created on the table containing the text column.

1. Pending table

Pending table 121 contains a list of all primary keys that have been updated (through an insert, update, or delete SQL operation) and that need attention.

2. In-Progress table

In progress table 122 contains all the primary keys that are currently being processed by the non-relational data server 140.

When a user inserts, updates, or deletes a cell of a text column a trigger also inserts a row into pending table 121 to note that the given cell has changed. The insert is done in the same transaction as the update to the base table and is only visible to DML queue 120 after the user issues a commit. An example of what the insert to pending table 121 looks like follows (PKEY=primary key for base table):

insert into pending (CID,PKEY)
values(my_column_id,my_pkey);

The row is inserted to pending table 121 without a timestamp. As the non-relational database server 140 begins to process the rows in DML Queue 120, the rows will also be timestamped and inserted into In-Process-Queue. When the server completes processing a row, it is deleted from In-Process-Queue.

In some cases, an application will not want to place a trigger on a table for DML Queue notification. According to the present invention, non-relational database server 140 provides an alternative DML Queue notification procedure. The DML Queue may be notified of updates to text by calling an SQL stored procedure.

3. Timestamps

To support the Oracle7 process model, and to support a sync operation, DML Queue 120 entries must be processed in the time order that they appeared. At a specified time interval on the order of a few minutes, and whenever sync is called, all unmarked rows within pending table 121 will be marked with a timestamp. The timestamp is a lower bound based on when that change was committed.

4. Sync

A user can ask to block until all the currently pending DML operations have been indexed. A user can also ask to wait until all the DML operations completed before a given timestamp have been indexed. Both requests ask the non-relational database server 140 to synchronize the changes in DML Queue 120 to a given timestamp.

These two operations are called "sync" although they do not actually force anything to happen. What they do is "watch" the pending table until given entries have disappeared.

A user may also ask the non-relational database server 140 up to what time it is synchronized. The non-relational database server 140 will pass back the lowest timestamp found in DML Queue 120. The user is then guaranteed that all changes committed on or before this time have also been indexed.

5. DML Queue and Create Index

It is possible to perform updates to a text column within a table while the non-relational database server 140 is creating an index on the same text column. In this case, any changes to the table being indexed by a non-relational database server 140, will be queued in DML Queue 120. However, the changes will not be processed until after the create index finishes. This avoids a race condition where the DML Queue request might be processed, but then overwritten by the create index, even though the create index was processing an older version of the document.

IV. Text Server Components

Non-relational database servers according to the present invention are polymorphic in nature, meaning they can be comprised of several different types of objects and they can take on different personalities. For example, the text server 300 in FIG. 5 is object-oriented and can instantiate different components depending on the type of text to be processed. If text server 300 is asked to index a text column containing Microsoft Word documents, text server 300 will instantiate an MS-Word filter. If text server 300 is asked to index a text column containing Novell WordPerfect documents, a Word-Perfect filter will be instantiated.

The following subsections discuss the replaceable components (objects) which can be integrated into text server 300. The framework provides a well defined interface for the integration of these components.

A. Engine

A specialized text engine is the largest component (in terms of the amount of work that it must do) which may be added to text server 300. Text engine 150 must be able to index a text column and, consequently, perform text retrieval over that same text column. In a preferred embodiment, text engine 150 stores its indexes within an SQL server.

The reason to use a special text engine is because text, and text applications, can differ. Some engines are optimized for certain types of text. Japanese text, for example, cannot be handled in the same manner as English and other European languages.

Text retrieval requires a text index for fast query performance. A text engine 150 within text server 300 according to the present invention has two major functions, index and query. Given a set of records, text engine 130 must be able to index that set and, consequently, satisfy text queries over that set.

In one embodiment, the present invention provides one text indexing engine. Engine 150 is general purpose and is suited for a broad range of text types and text applications. The text engine 150 extracts tokens from text and builds an inverted index. The actual implementation of the index is further optimized for fast query performance. Compression is applied to the index data to keep the size it requires on disk to a minimum. Engine 150 then uses this index to satisfy text query criteria.

The parameters which may be set for the text engine 150 include memory utilization or how much memory is text engine 150 allowed to use.

B. Filter

Filter 151 is used to perform text retrieval over word processing, or formatted documents. There may be multiple filters in text server 300. The system stores documents in their natural format and uses filters to build temporary ASCII views of documents. The system can then index the ASCII text of the formatted document.

Filter 151 used at indexing time must be synchronized with the filters used in a text viewing tool. This allows correct search term highlighting to be performed within the viewer.

For example, the system according to the present invention includes filters for Microsoft Word and Novell WordPerfect.

C. Lexer

Lexer 152 is the program code which breaks up text into its indexable tokens. English and most European languages can use the same lexer. Tokens in those languages are distinguished by white space and punctuation (comma, period, question mark, etc.).

Japanese and Chinese are pictorial based languages and cannot be tokenized in the same manner as English. A common text retrieval solution for these languages is a dictionary based lexer. The picture symbols used in the text are matched against a dictionary of known words to determine the tokens. This requires a specialized lexer.

Another language that may require a special lexer is German. Due to the heavy use of compound words in the German language, the tokenization process can benefit from a special lexer which will break up certain compound words.

The parameters which may be set for lexer 152 are:

1. Alpha-join characters. Characters which are not alphanumeric can be defined as characters which will join words into tokens. For example, by specifying "*" as an alpha-join character the word SQL*TextRetrieval will be indexed as one token rather than as the two tokens SQL and TextRetrieval.

2. Numeric-join characters. Characters which are not alphanumeric can be defined as characters which will join numbers into tokens. For example, by specifying "-" as a numeric-join character the date 05-04-95 will be indexed as one token.

D. Data Stores

The system uses a data stores 153 (object) to abstract the storage of text from the processing of text. In one embodiment, the system will provide support for three data stores: direct, external, and master/detail.

The direct data store simply means that the text is stored directly in the text column. The external data store is characterized by the storage of text in operating system file system. In the external data store, a character column is used to hold the name of the operating system file.

The third type of text column is a master/detail data store. This is for applications which have chosen to store text in a detail table. These applications use multiple rows to make up a single text item (a single document).

To summarize, examples of each of the three types of data stores are shown in Tables 5–7.

TABLE 5

Direct Data Store

| Table: | DIRECT_TEXT | |
|---|---|---|
| Columns: | TEXTKEY | number (unique primary key) |
| | TEXTDATE | date |
| | AUTHOR | varchar2(5) |
| | NOTES | varchar2(2000)(text column with direct text storage) |
| | TEXT | long (text column with direct text storage) |

TABLE 6

External Data Store

| Table: | EXTERNAL_TEXT | |
|---|---|---|
| Columns: | TEXTKEY | number (unique primary key) |
| | TEXTDATE | date |
| | AUTHOR | vachar2(50) |
| | NOTES | varchar2(2000) (text column with direct text storage) |
| | TEXT | varchar2(100) (text column OS file name) |

TABLE 7

Master/Detail Data Store

| Table | MD_HEADER | |
|---|---|---|
| Columns: | TEXTKEY | number (unique |

TABLE 7-continued

Master/Detail Data Store

| | | |
|---|---|---|
| | | primary key) |
| | TEXTDATE | ndate |
| | AUTHOR | varchar2(50) |
| Table | MD_TEXT | |
| | TEXTKEY | number (foreign key to MD_HEADER.TEXT KEY) |

E. Word List

In one embodiment of the present invention, there are three forms of a word list 155 component, soundex 155*a*, fuzzy match 155*b* and stemmer 154. These components expand a text query. Soundex expands a query by finding search tokens that sound similar to the specified search token. For example, a soundex search on the token "Newblood" would also search on the token "Newbold".

Fuzzy match expands a query by finding the spelling variants of a search token. For example, a fuzzy match search on the token "receive" will also search on the token "receive". Fuzzy match can be tuned specifically for typewritten text or for text which has been through the OCR process.

The non-relational database server according to the present invention provides an open interface to soundex and fuzzy match components because, similarly to stemming, different languages will have different requirements. Further, some languages may require word list support which is different than Soundex and Fuzzy Match.

Stemmer 154 is used to expand queries by deriving variations (verb conjugation; noun, pronoun, and adjective inflections) of a search token. For example, a stem search on the token "buy" will expand to search on tokens "buys", "buying", and "bought", but not on the token "buyer". A search on the token "buyer" will expand to search on "buyers".

Different languages have different stemming rules and, therefore, require different stemmers. In one embodiment, the supported languages are English, Spanish, French, German and Italian.

V. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A database management system, having an input device receiving a database query and an output device providing data, comprising:
   (a) a memory containing relational data and non-relational data; and
   (b) a processing system, coupled to the memory, including
      (i) a relational server, responsive to the database query, outputting relational data; and,
      (ii) a non-relational server, responsive to the database query, outputting non-relational data, wherein the database query is an SQL CONTAINS procedure statement.

2. A database management system, having an input device receiving a database query and an output device providing data, comprising:
   (a) a memory containing relational data and non-relational data; and
   (b) a processing system, coupled to the memory, including
      (i) a relational server, responsive to the database query, outputting relational data;
      (ii) a non-relational server, responsive to the database query, outputting non-relational data; and,
      (iii) means for parsing the database query into a relational database query and a non-relational database query, wherein the means for parsing is responsive to an SQL CONTAINS function statement.

3. A database management system, having an input device receiving a database query and an output device providing data, comprising:
   (a) a memory containing relational data and non-relational data; and
   (b) a processing system, coupled to the memory, including
      (i) a relational server, responsive to the database query, outputting relational data;
      (ii) a non-relational server, responsive to the database query, outputting non-relational data;
      (iii) means for parsing the database query into a relational database query and a non-relational database query;
      (iv) a first queue, coupled to the non-relational server, for storing the non-relational database query;
      (v) a second queue, coupled to the non-relational database server, for storing a non-relational database modification request; and
      (vi) a table, coupled to the non-relational server and the relational server, for storing a relational data pointer provided by the non-relational server.

4. A database management system, having an input device receiving a database query and an output device providing data, comprising:
   (a) a memory containing relational data and non-relational data; and
   (b) a processing system, coupled to the memory, including
      (i) a relational server, responsive to the database query, outputting relational data;
      (ii) a non-relational server, responsive to the database query, outputting non-relational data;
      (iii) means for parsing the database query into a non-relational database query and a non-relational database modification request;
      (iv) a first text queue, coupled to the non-relational server, for storing the non-relational database query, wherein the first text queue is an Oracle 7 Server Pipe;
      (v) a second queue, coupled to the non-relational database server, for storing a non-relational database modification request; and,
      (vi) a table, coupled to the non-relational server and the relational server, for storing a relational data pointer provided by the non-relational server.

5. An apparatus for providing data, comprising;
   (a) a memory containing relational data and non-relational data;
   (b) means for receiving a query, wherein the query is a Structured Query Language ("SQL") 92 statement;
   (c) means, coupled to the means for receiving, for parsing the query into a relational portion and a non-relational portion;

(d) means, coupled to the parsing means and memory, for providing relational data from the memory responsive to the query relational portion; and, (e) means, coupled to the parsing means and memory, for providing non-relational data from the memory responsive to the query non-relational portion.

6. An apparatus for providing data, comprising:

(a) a memory containing relational data and non-relational data;

(b) means for receiving a query, wherein the query is a Structured Query Language ("SQL") CONTAIN function statement;

(c) means, coupled to the means for receiving, for parsing the query into a relational portion and a non-relational portion;

(d) means, coupled to the parsing means and memory, for providing relational data from the memory responsive to the query relational portion; and, (e) means, coupled to the parsing means and memory, for providing non-relational data from the memory responsive to the query non-relational portion.

7. An apparatus for providing data, comprising:

(a) a memory containing relational data and non-relational data;

(b) means for receiving a query, wherein the query is a Structured Query Language ("SQL") CONTAIN procedure statement;

(c) means, coupled to the means for receiving, for parsing the query into a relational portion and a non-relational portion;

(d) means, coupled to the parsing means and memory, for providing relational data from the memory responsive to the query relational portion; and, (e) means, coupled to the parsing means and memory, for providing non-relational data from the memory responsive to the query non-relational portion.

8. A method for providing data from a database containing relational data and non-relational data, comprising the steps of:

(a) providing a Structured Query Language ("SQL") statement, wherein the SQL statement is an SQL 92 statement;

(b) parsing the SQL statement into a relational portion and a non-relational portion;

(c) processing the non-relational portion to obtain pointers to the non-relational data in the database;

(d) storing the non-relational pointers; and, (e) processing the relational portion and pointers to the non-relational data to obtain the data.

9. A method for providing data from a database containing relational data and non-relational data, comprising the steps of:

(a) providing Structured Query Language ("SQL") statement, wherein the SQL statement is a CONTAIN function;

(b) parsing the SQL statement into a relational portion and a non-relational portion;

(c) processing the non-relational portion to obtain pointers to the non-relational data in the database;

(d) storing the non-relational pointers; and, (e) processing the relational portion and pointers to the non-relational data to obtain the data.

10. A method for providing data from a database containing relational data and non-relational data, comprising the steps of:

(a) providing Structured Query Language ("SQL") statement, wherein the SQL statement is a CONTAIN procedure;

(b) parsing the SQL statement into a relational portion and a non-relational portion;

(c) processing the non-relational portion to obtain pointers to the non-relational data in the database;

(d) storing the non-relational pointers; and, (e) processing the relational portion and pointers to the non-relational data to obtain the data.

11. A method for providing data from a database containing relational data and non-relational data, comprising the steps of:

(a) providing a Structured Query Language ("SQL") statement;

(b) parsing the SQL statement into a relational portion and a non-relational portion;

(c) processing the non-relational portion to obtain pointers to the non-relational data in the database, comprising the steps of:

(i) queuing the non-relational portion on a queue;

(ii) popping the non-relational portion from the queue; and, (iii) processing the non-relational portion by a non-relational server;

(d) storing the non-relational pointers; and (e) processing the relational portion and pointers to the non-relational data to obtain the data.

12. The method of claim 11, wherein the non-relational server comprises a text server including a text engine, a filter and a lexer.

13. An article of manufacture, including a computer readable medium having computer readable program code means embodied therein for obtaining data in a database containing relational and non-relational data, the computer readable program code means in the article of manufacture comprising:

computer readable program code means for causing a computer to read a query statement;

computer readable program code means for causing a computer to parse the query into a relational portion and a non-relational portion;

computer readable program code means for causing a computer to obtain relational data from the database responsive to the relational portion;

computer readable program code means for causing a computer to obtain a pointer to the non-relational data in the database responsive to the non-relational portion; and computer readable program code means for causing a computer to display the relational data and non-relational data.

14. An article of manufacture, including a computer readable medium having computer readable program code means embodied therein for obtaining data in a database containing relational and non-relational data, the computer readable program code means in the article of manufacture comprising:

computer readable program code means for causing a computer to read a query statement having a relational portion and a non-relational portion, wherein the query statement is a Structured Query Language ("SQL") 92 statement;

computer readable program code means for causing a computer to parse the query into a relational portion and a non-relational portion;

computer readable program code means for causing a computer to obtain relational data from the database responsive to the relational portion;

computer readable program code means for causing a computer to obtain a pointer to the non-relational data in the database responsive to the non-relational portion; and, computer readable program code means for causing a computer to display the relational data and non-relational data.

15. An article of manufacture, including a computer readable medium having computer readable program code means embodied therein for obtaining data in a database containing relational and non-relational data, the computer readable program code means in the article of manufacture comprising:

computer readable program code means for causing a computer to read a query statement having a relational portion and a non-relational portion, wherein the query statement is a Structured Query Language ("SQL") CONTAIN function statement;

computer readable program code means for causing a computer to parse the query into a relational portion and a non-relational portion;

computer readable program code means for causing a computer to obtain relational data from the database responsive to the relational portion;

computer readable program code means for causing a computer to obtain a pointer to the non-relational data in the database responsive to the non-relational portion; and, computer readable program code means for causing a computer to display the relational data and non-relational data.

16. An article of manufacture, including a computer readable medium having computer readable program code means embodied therein for obtaining data in a database containing relational and non-relational data, the computer readable program code means in the article of manufacture comprising:

computer readable program code means for causing a computer to read a query statement having a relational portion and a non-relational portion, wherein the query statement is a Structured Query Language ("SQL") CONTAIN procedure statement;

computer readable program code means for causing a computer to parse the query into a relational portion and a non-relational portion;

computer readable program code means for causing a computer to obtain relational data from the database responsive to the relational portion;

computer readable program code means for causing a computer to obtain a pointer to the non-relational data in the database responsive to the non-relational portion; and, computer readable program code means for causing a computer to display the relational data and non-relational data.

* * * * *

UNITED STATES PATENT AND TRADEMARK OFFICE
CERTIFICATE OF CORRECTION

PATENT NO. : 5,819,251

DATED : October 6, 1998

INVENTOR(S) : Mark Kremer, Quoc Tai Tran, Michael Depledge, Santanu Makhopadhyay, William A. Keese, Behrouz Arbab-Dehkordi It is certified that error appears in the above-indentified patent and that said Letters Patent is hereby corrected as shown below:

In Column 19, Table 7, please delete "ndate" and insert -- date --.

Signed and Sealed this

Second Day of February, 1999

Attest:

Attesting Officer

Acting Commissioner of Patents and Trademarks